Patented June 28, 1938

2,122,278

UNITED STATES PATENT OFFICE 2,122,278

FLUORINATED PARAFFIN WAX

Frank M. Clark, Pittsfield, Mass., assignor to General Electric Company, a corporation of New York No Drawing. Application July 28, 1934, Serial No. 737,404

3 Claims. (Cl. 260—162)

The present invention comprises a new product consisting of a wax, such as paraffin wax, chemically combined with fluorin.

It has been suggested heretofore to employ paraffin wax to chemically combine with chlorine as an electrical insulating material but the chemical instability of chlorinated wax and its consequent deterioration has prevented its successful use.

Paraffin wax having fluorin combined therewith is chemically stable and has chemical and physical properties rendering it especially adapted for use as a dielectric material. In particular its high dielectric constant is of especial importance in capacitor construction. By using liquid fluorinated wax in place of ordinary mineral oil in capacitors, the bulk of a capacitor of a given capacity rating may be decreased as much as 50 to 75%.

Fluorinated wax may be prepared by causing chemical reaction between chlorinated mineral wax and antimony trifluoride in suitable solvent, such as benzene. The antimony trifluoride is used in the chemically equivalent amount to yield the fluorine necessary to replace the chlorine in the wax. The reaction is carried out with continuous stirring in the presence of a catalyst, such as antimony pentachloride, which should be present in an amount equal to about 5 to 10% by weight of the amount of the antimony fluoride. The reaction is carried out at the boiling point of the solvent in a suitable reflux apparatus. The material should be subjected to vigorous agitation. The fluorinated mineral wax is liquid at ordinary temperatures and can be separated from unreacted solids by filtration, the solvent finally being removed by distillation. The residual fluorinated wax is suitably purified by a contact or percolation process using fuller's earth or other suitable absorbent.

Fluorinated wax is chemically stable and non-volatile at ordinary temperature. Fluorinated wax containing about 25 per cent fluorine by weight has a pour point of about minus 14° C., a viscosity at 100° C. of 50 seconds and has a specific gravity of 0.99 at 15.5° C. (referred to water at 15.5° C.). Fluorinated wax containing 45 per cent of fluorine by weight has a pour point of minus 3° C., a viscosity at 100° C. of 94 seconds, and a specific gravity of 1.14 at 15.5°/15.5° C.

A fluorinated wax in which the proportion of combined fluorine is at least approximately equal to the proportion of combined hydrogen is non-inflammable. Its dielectric constant varies from about 5 to 7. The dielectric constant of mineral oil is about 2.2, hence a marked advantage is obtained in capacitors impregnated by the fluorinated product in place of mineral oil.

Because of its non-inflammability fluorinated wax can be advantageously used for imparting fire-resistance as well as imparting other advantages. While it is important that capacitors should be fire-proof, this property is of even greater importance in some other devices. For example, electric cables are commonly insulated with paper. By impregnating such paper with fluorinated wax it is both rendered non-inflammable and improved in other respects. The impregnated cable is resistant to moisture, is more resistant to electrical break-down and these properties are not subject to deterioration due to aging.

Fluorinated wax, although being a liquid, has a high viscosity at the operating temperature of electric transformers, or similar apparatus, in which insulating liquids are used also as circulating cooling fluids. To produce a liquid of lower viscosity fluorinated wax is associated with a more highly mobile liquid, such for example as trichlorbenzene or tetrachlor-ethylene. While various proportions may be used I have found a mixture of 50 parts by weight of fluorinated wax and 50 parts of either of the above liquids to be suitable for use as an insulating and cooling liquid.

A mixture of equal parts by weight of trichlorbenzene and fluorinated wax containing 25% fluorine has the following properties: a pour point of minus 45° C., a viscosity of 48 seconds at 37.8° C., and a specific gravity of 1.12 at 15.5° C. (referred to water at 15.5° C.).

A mixture of equal parts by weight of trichlorbenzene and fluorinated wax containing 45% fluorine has the following properties: a pour point of minus 40° C., a viscosity of 80 seconds at 77.8° C. and a specific gravity of 1.30 at 15.5° C., (referred to water at 15.5° C.).

What I claim as new and desire to secure by Letters Patent of the United States is:

1. A liquid dielectric and insulating composition having the essential chemical and physical properties of paraffin wax which contains about 25 to 45 per cent fluorine by weight.

2. A dielectric material consisting of mineral wax having chemically combined therewith at least about 25% fluorine, said material being liquid at temperatures as low as −3° C.

3. A liquid composition of matter consisting essentially of mineral wax which contains chemically combined therewith about 25% fluorine, said liquid being chemically stable, substantially non-volatile at ordinary temperatures, having a pour point of about −14° C., a viscosity of 50 seconds at 100° C., and a specific gravity of 0.99 at 15.5° C. referred to water at same temperature.

FRANK M. CLARK.